US009563869B2

(12) United States Patent
McQuade et al.

(10) Patent No.: US 9,563,869 B2
(45) Date of Patent: Feb. 7, 2017

(54) AUTOMATIC INCORPORATION OF VEHICLE DATA INTO DOCUMENTS CAPTURED AT A VEHICLE USING A MOBILE COMPUTING DEVICE

(71) Applicant: ZONAR SYSTEMS, INC, Seattle, WA (US)

(72) Inventors: Charles Michael McQuade, Issaquah, WA (US); Michael Charles King, Kent, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 0 days.

(21) Appl. No.: 14/288,056

(22) Filed: May 27, 2014

(65) Prior Publication Data

US 2014/0379208 A1 Dec. 25, 2014

Related U.S. Application Data

(63) Continuation-in-part of application No. 14/046,900, filed on Oct. 4, 2013, which is a continuation-in-part of
(Continued)

(51) Int. Cl.
*B60W 40/00* (2006.01)
*B60W 40/09* (2012.01)
(Continued)

(52) U.S. Cl.
CPC .......... *G06Q 10/0838* (2013.01); *B60W 40/09* (2013.01); *G07C 1/00* (2013.01); *G07C 5/085* (2013.01)

(58) Field of Classification Search
USPC ............. 701/33.2; 726/2, 21, 26–33
See application file for complete search history.

(56) References Cited

U.S. PATENT DOCUMENTS 3,990,067 A 11/1976 Van Dusen et al.
4,025,791 A 5/1977 Lennington et al.
(Continued)

FOREIGN PATENT DOCUMENTS

CA 2138378 11/1994
CA 2326892 10/1999
(Continued)

OTHER PUBLICATIONS

"The PenMaster" and "The PSION Workabout." Copyright 2000 GCS General Control Systems. <http://www.gcs.at/eng/produkte/hw/penmaster.htm>.
(Continued)

*Primary Examiner* — Yonel Beaulieu

(57) ABSTRACT

Documents related to delivery of loads shipped by trucking operators can be scanned or otherwise captured using mobile computing devices having document capture and/or document delivery functionality. Load related data can be manually input by drivers during the capture process. Such data can be incorporated into the scanned document as metadata. The concepts disclosed herein encompass establishing a logical connection between the mobile computing device implementing the document capture functionality and a vehicle ECU or vehicle data bus. The document capture application is configured to extract data from the vehicle ECU or vehicle data bus and incorporate that data into the document captured. Data, such as location data, can be similarly captured to establish a logical connection with a telematics device including a GPS component. Where the telematics device includes a wireless data link, the capture document can be wirelessly conveyed to a remote data center.

32 Claims, 7 Drawing Sheets

Related U.S. Application Data application No. 12/881,559, filed on Sep. 14, 2010, now Pat. No. 8,810,385.

(60) Provisional application No. 61/827,739, filed on May 27, 2013, provisional application No. 61/709,966, filed on Oct. 4, 2012, provisional application No. 61/710,720, filed on Oct. 7, 2012, provisional application No. 61/710,721, filed on Oct. 7, 2012, provisional application No. 61/711,197, filed on Oct. 8, 2012.

(51) Int. Cl.
*G07C 5/00* (2006.01)
*G07C 1/00* (2006.01)
*G06Q 10/08* (2012.01)
*G07C 5/08* (2006.01)

(56) References Cited

U.S. PATENT DOCUMENTS

| | | | |
|---|---|---|---|
| 4,258,421 A | 3/1981 | Juhasz et al. | |
| 4,325,057 A | 4/1982 | Bishop | |
| 4,602,127 A | 7/1986 | Neely et al. | |
| 4,688,244 A * | 8/1987 | Hannon et al. | 340/426.28 |
| 4,750,197 A * | 6/1988 | Denekamp et al. | 455/404.2 |
| 4,763,356 A | 8/1988 | Day, Jr. et al. | |
| 4,799,162 A | 1/1989 | Shinakawa et al. | |
| 4,804,937 A | 2/1989 | Barbiaux et al. | |
| 4,897,792 A | 1/1990 | Hosoi | |
| 5,058,044 A | 10/1991 | Stewart et al. | |
| 5,068,656 A | 11/1991 | Sutherland | |
| 5,128,651 A | 7/1992 | Heckart | |
| 5,206,643 A | 4/1993 | Eckelt | |
| 5,223,844 A | 6/1993 | Mansell et al. | |
| 5,243,323 A | 9/1993 | Rogers | |
| 5,321,629 A | 6/1994 | Shirata et al. | |
| 5,394,136 A | 2/1995 | Lammers et al. | |
| 5,399,844 A | 3/1995 | Holland | |
| 5,459,304 A | 10/1995 | Eisenmann | |
| 5,459,660 A | 10/1995 | Berra | |
| 5,499,182 A | 3/1996 | Ousborne | |
| 5,541,845 A | 7/1996 | Klein | |
| 5,546,305 A | 8/1996 | Kondo | |
| 5,557,254 A | 9/1996 | Johnson et al. | |
| 5,557,268 A | 9/1996 | Hughes et al. | |
| 5,572,192 A | 11/1996 | Berube | |
| 5,585,552 A | 12/1996 | Heuston et al. | |
| 5,600,323 A | 2/1997 | Boschini | |
| 5,610,596 A | 3/1997 | Petitclerc | |
| 5,629,678 A | 5/1997 | Gargano et al. | |
| 5,671,158 A | 9/1997 | Fournier et al. | |
| 5,680,328 A | 10/1997 | Skorupski et al. | |
| 5,719,771 A | 2/1998 | Buck et al. | |
| 5,731,893 A | 3/1998 | Dominique | |
| 5,754,965 A | 5/1998 | Hagenbuch | |
| 5,758,299 A | 5/1998 | Sandborg et al. | |
| 5,768,382 A | 6/1998 | Schneier et al. | |
| 5,808,565 A | 9/1998 | Matta et al. | |
| 5,839,112 A | 11/1998 | Schreitmueller et al. | |
| 5,874,891 A | 2/1999 | Lowe | |
| 5,942,753 A | 8/1999 | Dell | |
| 5,995,898 A | 11/1999 | Tuttle | |
| 6,043,661 A | 3/2000 | Gutierez | |
| 6,049,755 A | 4/2000 | Lou et al. | |
| 6,054,950 A | 4/2000 | Fontana | |
| 6,078,255 A | 6/2000 | Dividock et al. | |
| 6,092,021 A | 7/2000 | Ehlbeck et al. | |
| 6,107,915 A | 8/2000 | Reavell et al. | |
| 6,107,917 A | 8/2000 | Carrender et al. | |
| 6,128,959 A | 10/2000 | McGovern et al. | |
| 6,169,943 B1 | 1/2001 | Simon et al. | |
| 6,236,911 B1 | 5/2001 | Kruger | |
| 6,253,129 B1 | 6/2001 | Jenkins | |
| 6,256,579 B1 | 7/2001 | Tanimoto | |
| 6,263,273 B1 | 7/2001 | Henneken et al. | |
| 6,263,276 B1 | 7/2001 | Yokoyama et al. | |
| 6,278,928 B1 | 8/2001 | Aruga et al. | |
| 6,370,454 B1 | 4/2002 | Moore | |
| 6,374,176 B1 | 4/2002 | Schmier et al. | |
| 6,396,413 B2 | 5/2002 | Hines et al. | |
| 6,411,891 B1 | 6/2002 | Jones | |
| 6,438,472 B1 | 8/2002 | Tano et al. | |
| 6,450,411 B1 | 9/2002 | Rash et al. | |
| 6,456,039 B1 | 9/2002 | Lauper et al. | |
| 6,505,106 B1 | 1/2003 | Lawrence | |
| 6,529,808 B1 | 3/2003 | Diem | |
| 6,539,296 B2 | 3/2003 | Diaz et al. | |
| 6,594,621 B1 | 7/2003 | Meeker | |
| 6,597,973 B1 | 7/2003 | Barich et al. | |
| 6,614,392 B2 | 9/2003 | Howard | |
| 6,664,897 B2 | 12/2003 | Pape et al. | |
| 6,671,646 B2 | 12/2003 | Manegold et al. | |
| 6,708,113 B1 | 3/2004 | Von Gerlach et al. | |
| 6,735,542 B1 | 5/2004 | Burgett et al. | |
| 6,801,901 B1 | 10/2004 | Ng | |
| 6,804,626 B2 | 10/2004 | Manegold et al. | |
| 6,834,259 B1 | 12/2004 | Markwitz et al. | |
| 6,847,887 B1 | 1/2005 | Casino | |
| 6,856,897 B1 | 2/2005 | Phuyal | |
| 6,894,617 B2 | 5/2005 | Richman | |
| 6,909,947 B2 | 6/2005 | Douros et al. | |
| 7,027,955 B2 | 4/2006 | Markwitz et al. | |
| 7,035,733 B1 | 4/2006 | Alwar et al. | |
| 7,048,185 B2 | 5/2006 | Hart et al. | |
| 7,103,460 B1 | 9/2006 | Breed | |
| 7,174,243 B1 | 2/2007 | Lightner et al. | |
| 7,174,277 B2 | 2/2007 | Vock et al. | |
| 7,184,866 B2 * | 2/2007 | Squires et al. | 701/29.3 |
| 7,254,516 B2 | 8/2007 | Case, Jr. et al. | |
| 7,424,414 B2 | 9/2008 | Craft | |
| 7,692,552 B2 | 4/2010 | Harrington et al. | |
| 8,577,703 B2 | 11/2013 | McClellan et al. | |
| 8,604,920 B2 | 12/2013 | Armitage et al. | |
| 8,849,501 B2 | 9/2014 | Cook et al. | |
| 8,918,229 B2 | 12/2014 | Hunt | |
| 8,930,040 B2 | 1/2015 | Gompert et al. | |
| 8,996,287 B2 * | 3/2015 | Davidson et al. | 701/119 |
| 2001/0018628 A1 * | 8/2001 | Jenkins | G08G 1/127 |
| | | | 701/33.4 |
| 2001/0047283 A1 | 11/2001 | Melick et al. | |
| 2001/0053983 A1 | 12/2001 | Reichwein et al. | |
| 2002/0016655 A1 | 2/2002 | Joao | |
| 2002/0022979 A1 | 2/2002 | Whipp et al. | |
| 2002/0022984 A1 | 2/2002 | Daniel et al. | |
| 2002/0065698 A1 | 5/2002 | Schick et al. | |
| 2002/0107833 A1 | 8/2002 | Kerkinni | |
| 2002/0107873 A1 | 8/2002 | Winkler et al. | |
| 2002/0111725 A1 | 8/2002 | Burge | |
| 2002/0116122 A1 | 8/2002 | Satonaka | |
| 2002/0122583 A1 | 9/2002 | Thompson | |
| 2002/0133273 A1 | 9/2002 | Lowrey et al. | |
| 2002/0133275 A1 | 9/2002 | Thibault | |
| 2002/0147610 A1 | 10/2002 | Tabe | |
| 2002/0150050 A1 | 10/2002 | Nathanson | |
| 2002/0156558 A1 | 10/2002 | Hanson et al. | |
| 2002/0163449 A1 | 11/2002 | Flick | |
| 2002/0165669 A1 | 11/2002 | Pinto et al. | |
| 2002/0178147 A1 | 11/2002 | Arroyo et al. | |
| 2002/0188593 A1 | 12/2002 | Moser et al. | |
| 2003/0030550 A1 | 2/2003 | Talbot | |
| 2003/0033061 A1 | 2/2003 | Chen et al. | |
| 2003/0033071 A1 | 2/2003 | Kawasaki | |
| 2003/0109973 A1 | 6/2003 | Hensey et al. | |
| 2003/0120745 A1 | 6/2003 | Katagishi et al. | |
| 2003/0182033 A1 | 9/2003 | Underdahl | |
| 2004/0009819 A1 | 1/2004 | Koga | |
| 2004/0054470 A1 | 3/2004 | Farine et al. | |
| 2004/0236596 A1 | 11/2004 | Chowdhary et al. | |
| 2004/0243368 A1 | 12/2004 | Hierner et al. | |
| 2005/0107946 A1 | 5/2005 | Shimizu | |
| 2005/0209775 A1 | 9/2005 | Entenmann | |
| 2005/0273250 A1 | 12/2005 | Hamilton et al. | |

(56) References Cited

U.S. PATENT DOCUMENTS

| | | | |
|---|---|---|---|
| 2007/0001831 A1 | 1/2007 | Raz et al. | |
| 2007/0083314 A1 | 4/2007 | Corigliano | |
| 2007/0156337 A1 | 7/2007 | Yanni | |
| 2007/0179709 A1 | 8/2007 | Doyle | |
| 2008/0010016 A1* | 1/2008 | Wickey | G08G 1/202 701/469 |
| 2008/0154489 A1 | 6/2008 | Kaneda et al. | |
| 2008/0154712 A1 | 6/2008 | Wellman | |
| 2008/0243389 A1 | 10/2008 | Inoue | |
| 2008/0262646 A1* | 10/2008 | Breed | 700/226 |
| 2008/0319602 A1 | 12/2008 | McClellan et al. | |
| 2009/0143923 A1* | 6/2009 | Breed | 701/1 |
| 2009/0156310 A1 | 6/2009 | Fargo | |
| 2009/0186325 A1 | 7/2009 | Kumar | |
| 2010/0160013 A1 | 6/2010 | Sanders | |
| 2010/0209884 A1 | 8/2010 | Lin et al. | |
| 2010/0209890 A1 | 8/2010 | Huang et al. | |
| 2010/0209891 A1 | 8/2010 | Lin et al. | |
| 2010/0211278 A1 | 8/2010 | Craig | |
| 2011/0112739 A1 | 5/2011 | O'Dea | |
| 2011/0148618 A1 | 6/2011 | Harumoto et al. | |
| 2011/0161116 A1 | 6/2011 | Peak et al. | |
| 2012/0256770 A1 | 10/2012 | Mitchell | |
| 2013/0046559 A1 | 2/2013 | Coleman et al. | |
| 2013/0164712 A1 | 6/2013 | Hunt et al. | |
| 2013/0164713 A1 | 6/2013 | Hunt et al. | |
| 2013/0164715 A1 | 6/2013 | Hunt et al. | |
| 2013/0166170 A1 | 6/2013 | Hunt et al. | |
| 2013/0184965 A1 | 7/2013 | Hunt et al. | |
| 2013/0209968 A1 | 8/2013 | Miller | |
| 2013/0274955 A1 | 10/2013 | Rosenbaum | |
| 2013/0345927 A1 | 12/2013 | Cook et al. | |
| 2014/0257943 A1 | 9/2014 | Nerayoff et al. | |
| 2014/0309849 A1 | 10/2014 | Ricci | |
| 2014/0350777 A1 | 11/2014 | Kawai et al. | |
| 2014/0365070 A1 | 12/2014 | Yano et al. | |
| 2015/0291176 A1 | 10/2015 | Jeong | |

FOREIGN PATENT DOCUMENTS

| | | |
|---|---|---|
| CA | 2388572 T1 | 5/2001 |
| EP | 2116968 A1 | 11/2009 |
| JP | 280985 A | 10/2001 |
| WO | 03023550 | 3/2003 |

OTHER PUBLICATIONS

Tiscor: Inspection Manager 6.0 User Guide. USA; 2004.1-73.

"D. 0. T. Driver Vehicle Inspection Reports on your wireless phone!" FleeTTrakkeR LLC 2002-2003 FleeTTrakkeR LLC . All rights reserved <http://www.fleettrakker.com/web/index.jsp>.

"Detex Announces the Latest Innovation in Guard Tour Verification Technology." DETEX Life Safety, Security and Security Assurance. Jan. 1, 2003. 1pp. © 2002-2004 Detex Corporation. <http://www.detex.com/NewsAction.jspa?id=3>.

"Nextel, Motorola and Symbol Technologies Offer First Wireless Bar Code Scanner for Mobile Phones." InvoiceDealers.

"The Data Acquisition Unit Escorte." The Proxi Escort.com. Nov. 20, 2001. 4pp. © 2000 GCS General Control Systems. <http://www.gcs.at/eng/produkte/hw/escorte.htm>.

"Tracking out of route: software helps fleets compare planned routes to actual miles. (Technology)." Commercial Carrier Journal. Published Oct. 1, 2005. 4pp. NDN-219-1054-1717-0.

"What is the Child Check-Mate Safety System?" 2002@Child Checkmate Systems, Inc. <http://www.childcheckmate.com/what.html>.

Albright, Brian: "Indiana Embarks on Ambitious RFID roll out." Frontline Solutions. May 20, 2002; 2pp. Available at: <http://www.frontlinetoday.comlfrontline/article/articleDetail.jsp?id=19358>.

Anonymous. "Transit agency builds GIS to plan bus routes." American City & County. vol. 118, No. 4. Published Apr. 1, 2003. 4pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

Dwyer, B.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Govemment: A Story Behind It's Ranking." Incontext Indiana;s Workforce and Economy. Jan.-Feb. 2003 vol. 4, No. 5pp. Available at <http://www.incontext.indiana.edu/2003/janfeb03/governement.html>.

Quaan et al., "Guard Tour Systems." Security Management Online. Sep. 16, 2003. 1pg. © 2000 Available at: <http://www.securitymanagement.comiubb/Forum30/HTMLI000066.html>.

Qualcomm. "Object FX Integrates TrackingAdvisor with Qualcomm's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving a Niche Beyond Asset Tracking." Business Solutions. Feb. 1999: 5pp. Available at: <http://www.businesssolutionsmag.comiArticles/1999_02/990208.html>.

Tiscor: The Mobile Software Solutions Provider. Inspection Manager: An Introduction and Slide Presentation; 19pp. Available: <www/TOSCOR.com>.

Tsakiri, M et al. Abstract: "Urban fleet monitoring with GPS and GLONASS." Journal ofNavigation, vol. 51, No. 3. Published Sep. 1998. 2pp. NDN-174-0609-4097-3.

Tuttle, John R. "Digital RF/ID Enhances GPS" Proceedings of the Second Annual Wireless Symposium, pp. 406-411, Feb. 15-18, 1994, Santa Clara, CA.

Want, Roy, "RFID A Key to Automating Everything." Scientific American (Jan. 2004): 58-65.

* cited by examiner

AUTOMATIC INCORPORATION OF VEHICLE DATA INTO DOCUMENTS CAPTURED AT A VEHICLE USING A MOBILE COMPUTING DEVICE

RELATED APPLICATIONS

This application is a continuation-in-part of application Ser. No. 14/046,900, filed Oct. 4, 2013 which in turn claims benefit to provisional application Ser. No. 61/709,966 filed Oct. 4, 2012, Ser. No. 61/710,720, filed Oct. 7, 2012, Ser. No. 61/710,721, filed Oct. 7, 2012 and Ser. No. 61/711,197, filed Oct. 8, 2012. This application is also a continuation-in-part of application Ser. No. 12/881,559, filed Sep. 14, 2010, now U.S. Pat. No. 8,810,385. This application is also based on a prior provisional application Ser. No. 61/827,739, filed on May 27, 2013, the benefit of the filing dates of which is hereby claimed under 35 U.S.C. §119(e). All of these applications are incorporated by reference as if fully set forth herein.

BACKGROUND

As the cost of sensors, communications systems and navigational systems has dropped, operators of commercial and fleet vehicles now have the ability to collect a tremendous amount of data about the vehicles that they operate, including how the vehicles are being driven by the drivers operating such vehicles.

Unfortunately, simply collecting such data does not automatically translate into cost savings. It would be desirable to provide such fleet operators with additional tools in order to derive a benefit from the wealth of data that can be collected. Preferably, such tools can be used to provide feedback to fleet operators that can be translated into cost savings.

SUMMARY

One aspect of the novel concepts presented herein is directed to incorporating data from a vehicle data bus or vehicle ECU into documents scanned or otherwise captured using mobile computing devices having document capture and/or document delivery functionality. Load related data can be manually input by drivers during the capture process. Such data can be incorporated into the scanned document as metadata. The concepts disclosed herein encompass establishing a logical connection between the mobile computing device implementing the document capture functionality and a vehicle ECU or vehicle data bus. The document capture application is configured to extract data form the vehicle ECU or vehicle data base and incorporate that data into the document captured.

In one embodiment, such data captured from the vehicle includes fuel usage data.

In one embodiment, such data captured from the vehicle includes fault code data.

In one embodiment, such data captured from the vehicle includes engine parameters associated a trip related to the scanned document. Such parameters can include one or more of fuel used in the trip, brake temperature during the trip, cargo area temperature during the trip, reefer fuel consumed during the trip, tire pressure during the trip, ambient temperature during the trip, maximum speed during the trip, driver behavior during the trip (one or more of speed events, idle time, top gear usage, RPM sweet spot usage, hard braking events, hard cornering events). Trips can be defined by geofencing, key/on key off events, or user input.

Some vehicle may need additional sensors added to collect the data noted above. In some embodiments such trip data is collected in a buffer that is part of a telematics device at the vehicle. Where the telematics device includes a GPS component the GPS location of the document capture is incorporated into document capture. A plurality of GPS locations corresponding to the trip can be included in the document capture. A trip can be defined as key on/key off events. Where the telematics device includes a wireless data link, the capture document can be wirelessly conveyed to a remote data center.

In one embodiment a logical connection is established between the mobile computing device with the document capture program and the vehicle le data bus using a wireless connection. In one embodiment the wireless connection is Wi-Fi.

In another embodiment, documents scanned or otherwise captured using mobile computing devices having document capture and/or document delivery functionality are conveyed to a remote server by establishing a logical connection between the mobile computing device and a telematics device at the vehicle including a wireless data link. In one embodiment the wireless data link is cellular. In a related embodiment the telematics device includes a GPS component, and GPS data is added to the scanned/captured document to verify the location of the vehicle at the time of document capture. In a related embodiment, a breadcrumb or trip report corresponding to the delivery associated with the document being scanned is captured and stored in the telematics device, and then added to the scanned document during or after capture. The telematics device can capture vehicle data (such as speed, brake use, temperature in cargo area, fuel use, fault codes, hard braking, max speed) from the vehicle data bus. Such data can help the shipper evaluate the deliver (did the driver exceed speed limits, was the cargo kept the proper temperature, did the driver brake too often, did the driver overheat the brakes and operate unsafely).

Various combinations and permutations of the telematics device connection and vehicle ECU/databus connection are possible.

In at least some embodiments the data from the vehicle or telematics device is added to the scanned document as metadata. The added data can be incorporated during the scanning/data capture, or after.

In at least some embodiments, instead of (or in addition to) including data from a vehicle databus or ECU into documents captured using a document scanning application (or a camera) from a mobile computing device, data from a vehicle telematics device is added to the scanned document as metadata. The added data can be incorporated during the scanning/data capture, or after. Data from the vehicle telematics device can include one of more of position data (such as GPS data), speed data, idle time data computed by telematics device, hard braking events detected by the telematics device, hard cornering events detected by the telematics device, and sensor data from one or more sensors on the vehicle that are logically coupled to the telematics device (exemplary types of sensors include one or more of a power take off unit actuation sensor, a stop arm actuation sensor, a snow plow actuation sensor, a door opening sensor, an emergency door opening sensor, a temperature sensor, and a door lock sensor. In some embodiments, the telematics device includes a GPS component, a wireless data link component, and an accelerometer component (the accelerometer can be useful for capturing hard braking and hard cornering events).

An exemplary position sensing system is the Global Positioning System (GPS). The GPS system is a space-based satellite navigation system that provides location and time information in all weather, anywhere on or near the Earth, where there is an unobstructed line of sight to four or more GPS satellites. It is maintained by the United States government and is freely accessible to anyone with a GPS receiver. It should be understood that when the term GPS is used herein and the claims that follow to refer to a component located at a vehicle, that such a component is a receiver for receiving satellite signals from the GPS system. Further, it should be understood that the concepts disclosed herein can be implemented using different types of vehicle position sensing systems, such as the Russian Global Navigation Satellite System (GLONASS), the planned European Union Galileo positioning system, the Chinese Compass navigation system, and the Indian Regional Navigational Satellite System, and similar such systems as they are developed. The concepts disclosed herein can also be implemented by relying on basic triangulation of signals received from terrestrial based transmitters (such as cell towers), should sufficient transmitters be available (and should the vehicle position resolution obtainable using such technology be generally comparable with that available from satellite based systems).

Those of ordinary skill in the art will readily recognize that a number of different types of sensors are commonly integrated into commercial, passenger, and fleet vehicles. Such sensors can readily collect a wide variety of operational data that may be of value in evaluating whether a delivery was performed in a quality fashion.

In one embodiment of the concepts disclosed herein, data added to a scanned or otherwise captured document will be reviewed by the shipper to determine if the carrier (a third party contracted by the shipper to provide delivery) has performed as agreed.

In one related embodiment, the data added to the scanned document relates to a temperature in a cargo hold or cargo area. This is particularly valuable for shippers of perishable goods, such as food products, or other goods that can be damaged by excessive temperatures.

In one related embodiment, the data added to the scanned document relates to a time and/or location the load arrived at the delivery location. Time and location data can be provided by a telematics unit including a GPS component.

In one related embodiment, the data added to the scanned document relates to driver performance metrics, which can be used to assure the shipper that the driver performed in a safe and workmanlike manner. Such driver performance metrics can include on or more of the following: speed, hard braking events, brake temperature, tire pressure, hard cornering events, and excessive brake use. Such metrics can indicate that the driver of the load operated in an unsafe or risky manner. Shippers would find such information valuable as they can use such information to evaluate whether to use a given shipper/carrier in the future.

In one embodiment of the concepts disclosed herein, data added to a scanned or otherwise captured document will be reviewed by the vehicle owner/operator to determine if the driver has performed as agreed. This aspect related to managing employee performance.

In one related embodiment, the data added to the scanned document relates to a temperature in a cargo hold or cargo area. This is particularly valuable for shippers of perishable goods, such as food products, or other goods that can be damaged by excessive temperatures.

In one related embodiment, the data added to the scanned document relates to a time and/or location the load arrived at the delivery location. Time and location data can be provided by a telematics unit including a GPS component.

In one related embodiment, the data added to the scanned document relates to driver performance metrics, which can be used to assure the carrier/employer of the driver that the driver performed in a safe and workmanlike manner. Such driver performance metrics can include on or more of the following: speed, hard braking events, brake temperature, tire pressure, hard cornering events, excessive brake use, idle metrics, use of top gear (an efficiency metric), use of cruise control (an efficiency metric), and use of accessory devices (an efficiency metric). Such metrics can indicate that the driver of the load operated in an unsafe or risky manner, or an inefficient manner. Employers would find such information valuable as they can use such information to evaluate whether to use a given driver has performed responsibly.

In one related embodiment, the scanned document including the additional data (i.e., GPS data, ECU data, and/or sensor data) is conveyed from the vehicle to a remote storage location via a wireless data link. The transmission can be automatic or dependent upon user input. In at least one embodiment, a user at a location remote from the vehicle accesses the metadata to validate some aspect of delivery. In at least one embodiment, the metadata from the document is automatically analyzed by a computing device remote from the vehicle to validate some aspect of delivery.

While the term metadata has been used to define how (or where) the data (i.e., GPS data, ECU data, and/or sensor data) is included in the document captured by the mobile computing device, it should be understood that the concepts disclosed herein (i.e., automatically adding telematics data, sensor data, or vehicle ECU/data link data into a captured document) can be used to incorporate such additional data into a captured document using any data processing technical that being known. In other words, if adding data to a data structure in a location other than metadata becomes known, the data (i.e., GPS data, ECU data, and/or sensor data) can be incorporated into the captured document using such techniques.

The terms captured documents and scanned documents has been used herein to describe how a physical document (on or image, such as a picture of a load being delivered, or a picture of damage to a load) is digitized (i.e., stored as a digital file). The concepts disclosed herein can be implemented in any digitization paradigm than allows for the addition of extra data (the extra data being on or more of GPS data, ECU data, and/or sensor data). The term digitized document and digitization is also used to refer to such a process.

The term ECU data as used herein is intended to encompass data extracted from a vehicle processor, a vehicle control unit, and or a vehicle data bus.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a high level flow chart showing the overall method steps implemented in accord with one exemplary embodiment for achieving the concepts disclosed herein;

FIG. 2 schematically illustrates a vehicle that includes a plurality of sensors configured to collect the required metrics;

Figure 4:
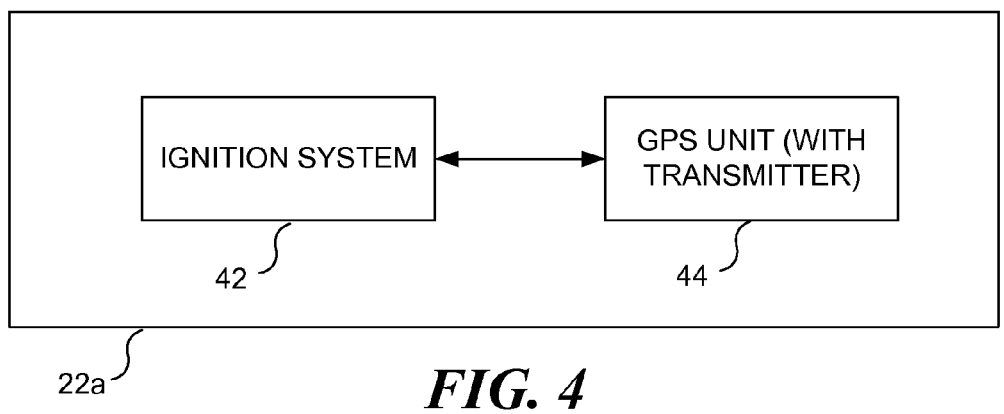
Figure 5:
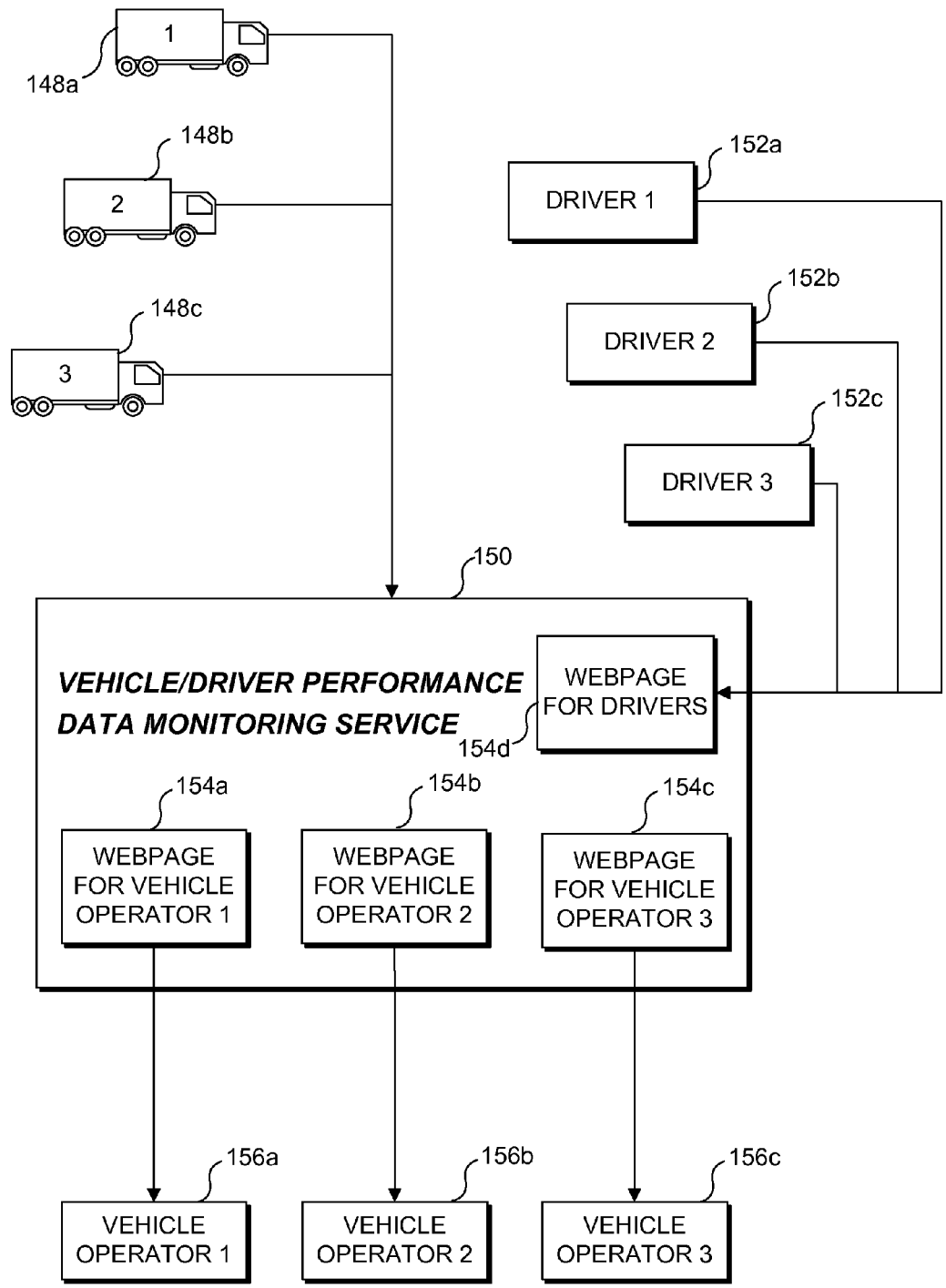
Figure 6:
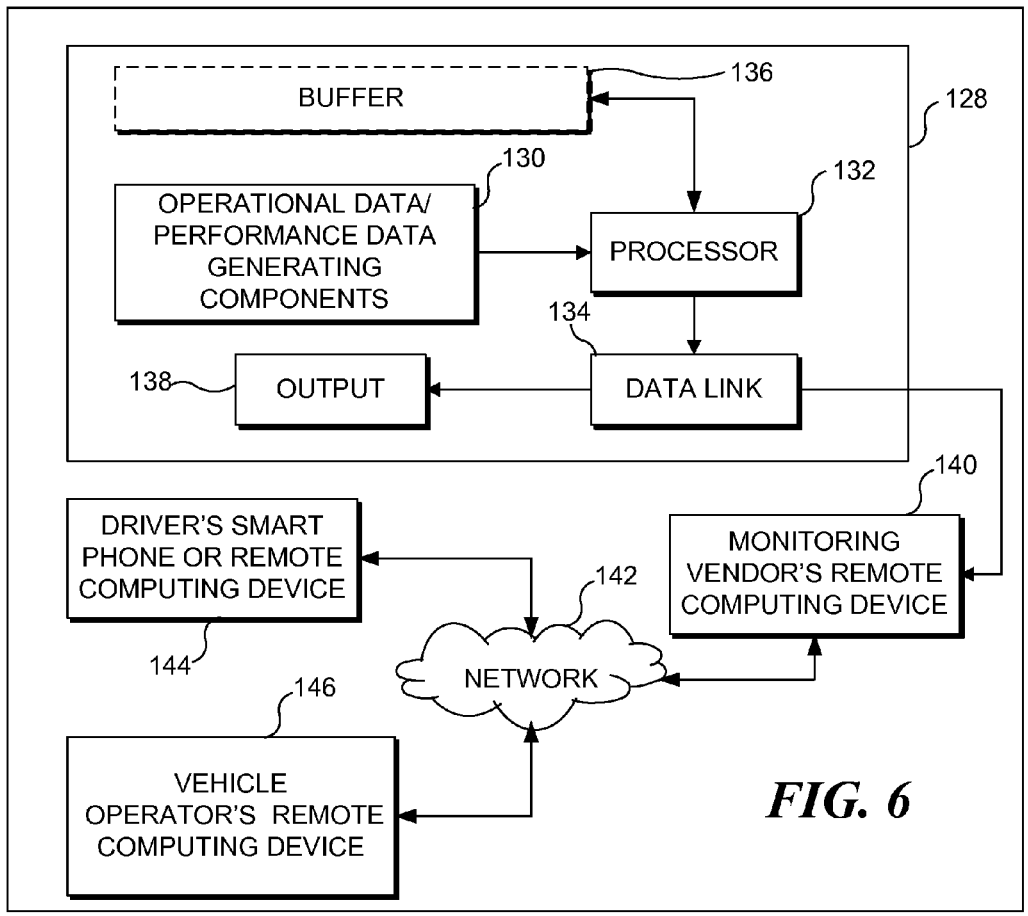
Figure 7:
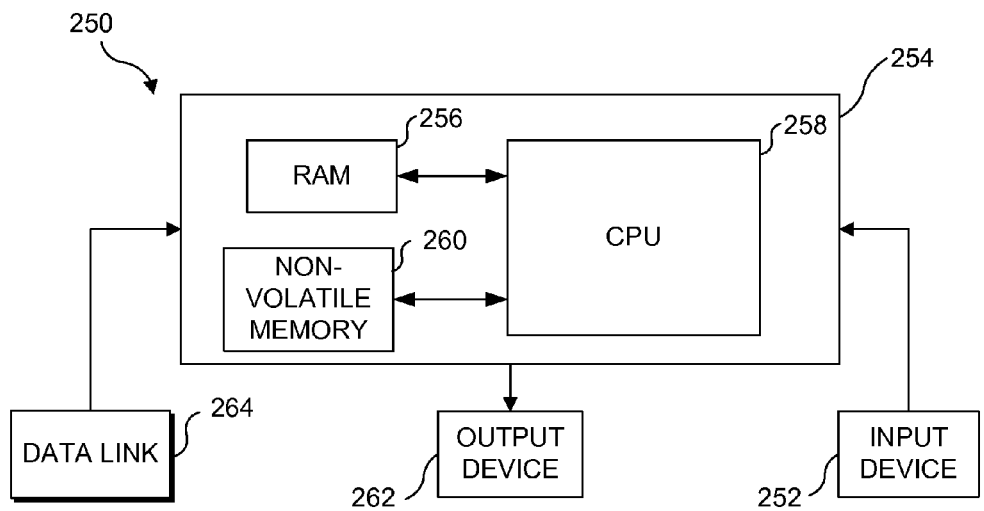
Figure 8:
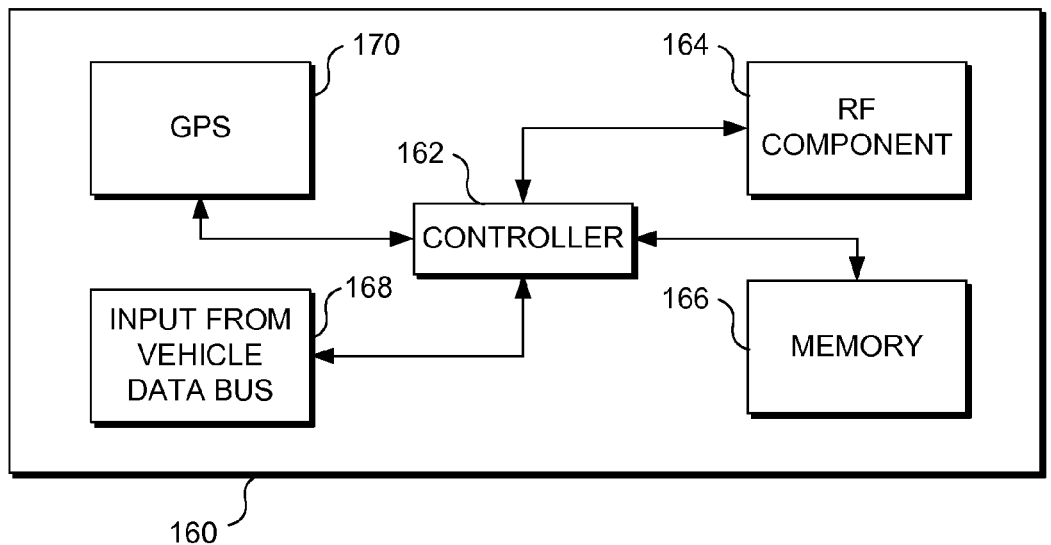
Figure 9:
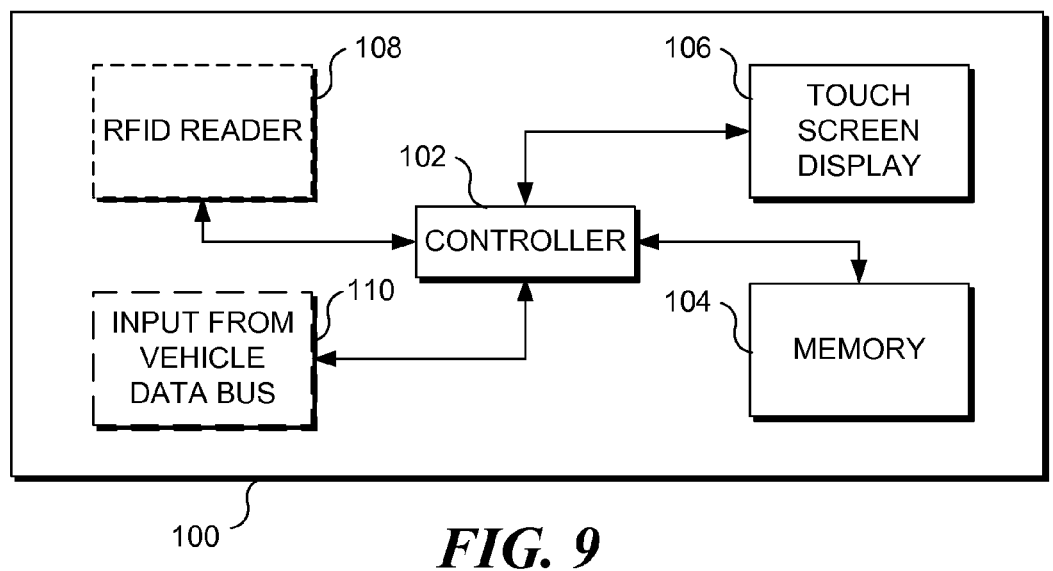
Figure 10A:
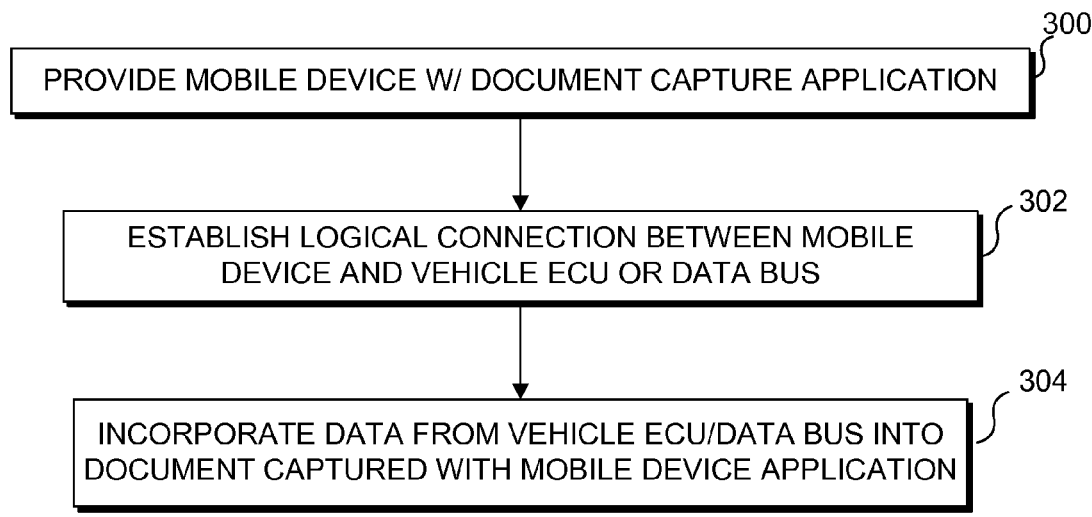
Figure 10B:
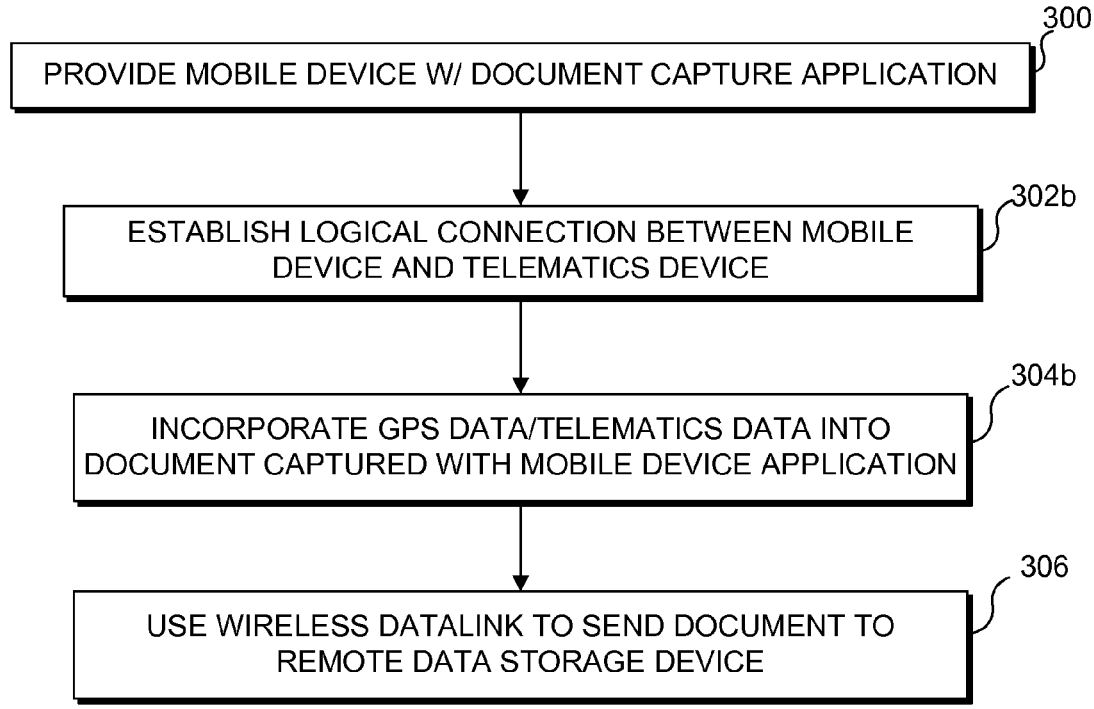
Figure 11:
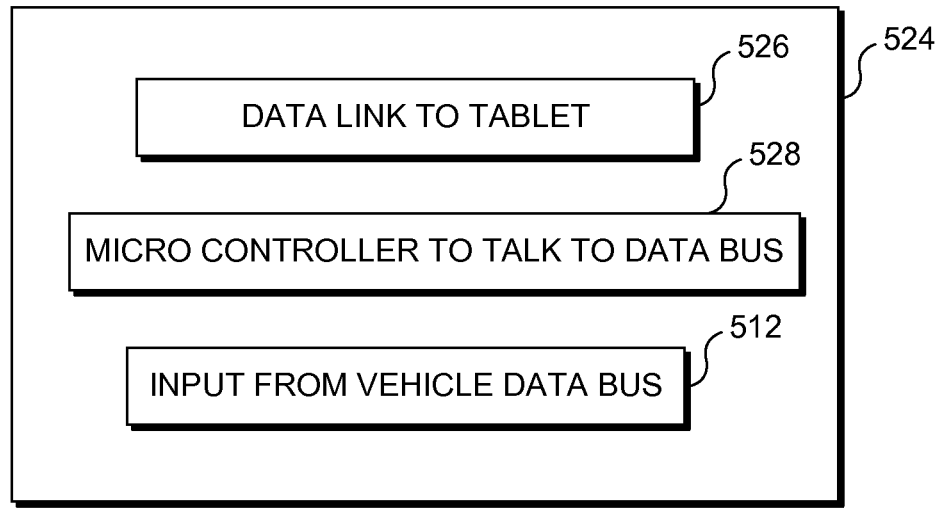
Figure 12:
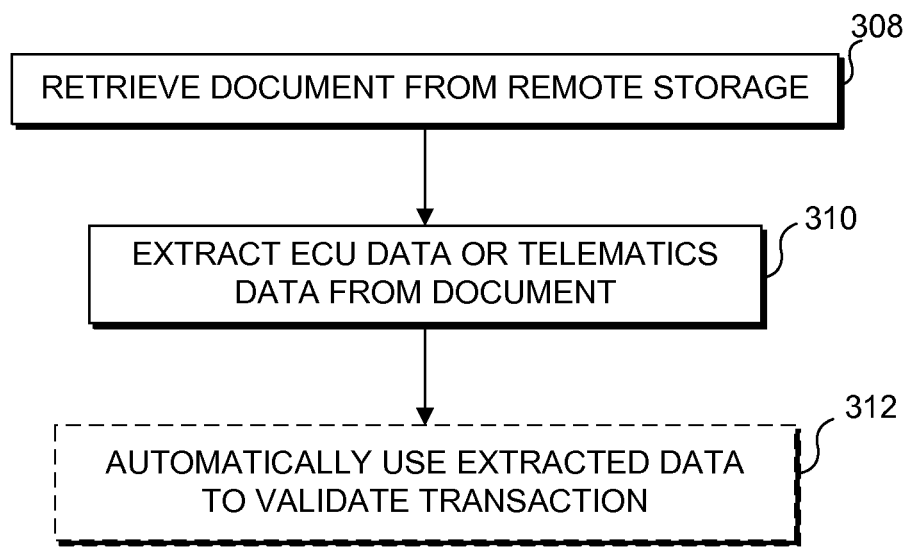

FIG. 4 schematically illustrates a vehicle that includes a GPS unit configured to collect GPS data that can be used to determine a plurality of metrics for use in determining a driver performance ranking;

FIG. 5 is a functional block diagram illustrating exemplary elements in a vehicle/driver performance monitoring system in accord with one aspect of the concepts disclosed herein;

FIG. 6 is a another functional block diagram illustrating exemplary elements in a vehicle/driver performance monitoring system in accord with one aspect of the concepts disclosed herein;

FIG. 7 is an exemplary computing environment for implementing some of the concepts disclosed herein;

FIG. 8 is a functional block diagram of an exemplary telematics device added to an enrolled vehicle to implement one or more of the methods disclosed herein; and FIG. 9 is a functional block diagram of an exemplary mobile computing device, such as a Tablet, added to a fleet vehicle to implement one or more of the concepts disclosed herein; and FIG. 10A is a flowchart of a method for adding load related data collected from a vehicle data bus, and added to scanned or capture load documents;

FIG. 10B is a flowchart of a method for adding load related data collected from a vehicle telematics device, and added to scanned or capture load documents;

FIG. 11 schematically illustrates a smart cable that performs the function of providing a communication link between a vehicle data bus and another computing device, such as a mobile computing device that includes a document capture functionality;

FIG. 12 is a flowchart of a method for analyzing adding load related data collected from a vehicle data bus or vehicle telematics device at a computing device remote from the vehicle.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits).

Exemplary Logic for Determining Driver/Vehicle Performance

Figure 1:
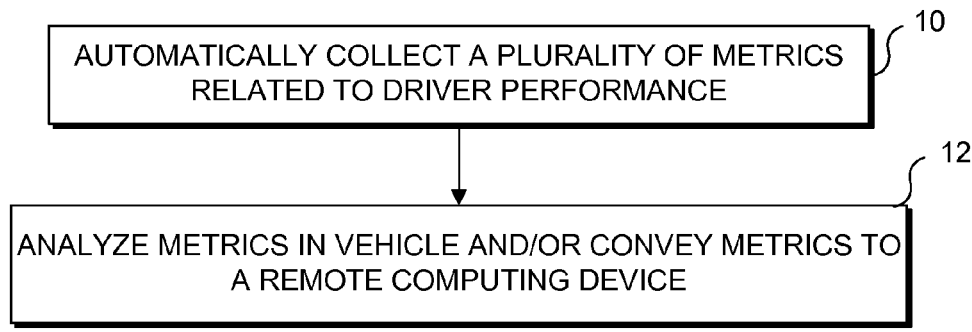

FIG. 1 is a high level flow chart showing the overall method steps implemented in accord with one aspect of the concepts disclosed herein. In a block 10 a plurality of metrics related to vehicle or driver performance and/or vehicle are automatically collected by a plurality of sensors incorporated into a vehicle. Such metrics can include, but are not limited to, vehicle speed, vehicle acceleration, vehicle deceleration, engine RPMs, idle time, engine temperature, coolant temperature, oil temperature, fuel consumption, and vehicle positional data. Those of ordinary skill in the art will readily recognize that many different metrics related to vehicle performance and driver performance can be collected. Thus, it should be recognized that the specifically identified metrics are intended to be exemplary, rather than limiting. In a block 12, the metrics are analyzed in the vehicle, and/or conveyed to a remote computing device for analysis. Various embodiments of the concepts disclosed herein implement permutations and combinations of data analysis at the vehicle and remotely.

Figure 2:
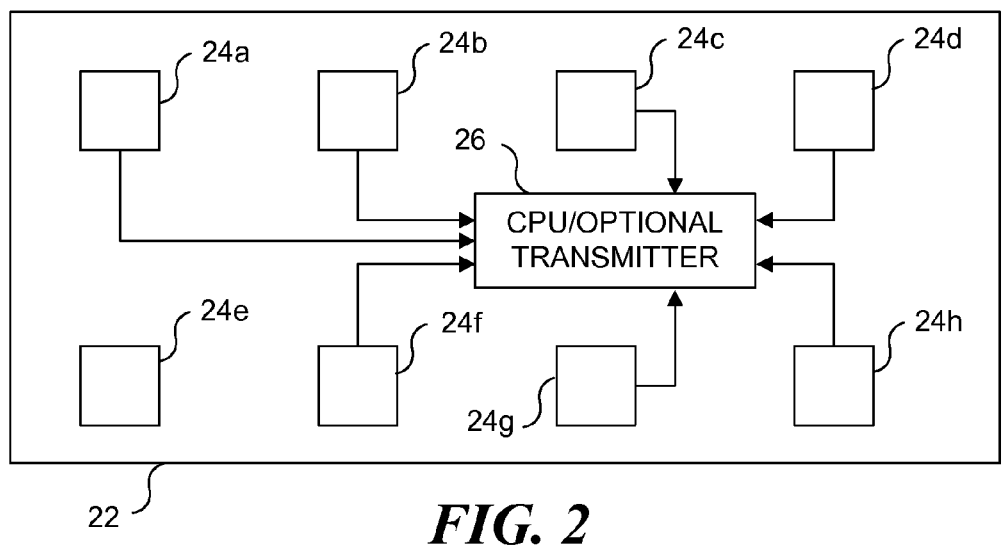

FIG. 2 schematically illustrates a vehicle including a plurality of sensors configured to collect the required metrics. A vehicle 22, such as a bus or a truck, includes a plurality of sensors 24a-24h. It should be recognized that the specific number of sensors, and the specific types of sensors and types of data collected by the sensors, are not critical, so long as the sensors collect data for the desired metrics. As noted above, a plurality of different metrics have been specifically identified, however it should be recognized that such metrics are intended to be exemplary, and not limiting on the concepts disclosed herein. In the disclosed exemplary embodiment, each sensor is coupled to a CPU 26 (which, as described in greater detail below, may in some of embodiments be replaced with (or provided in addition to) a transmitter).

Figure 3A:
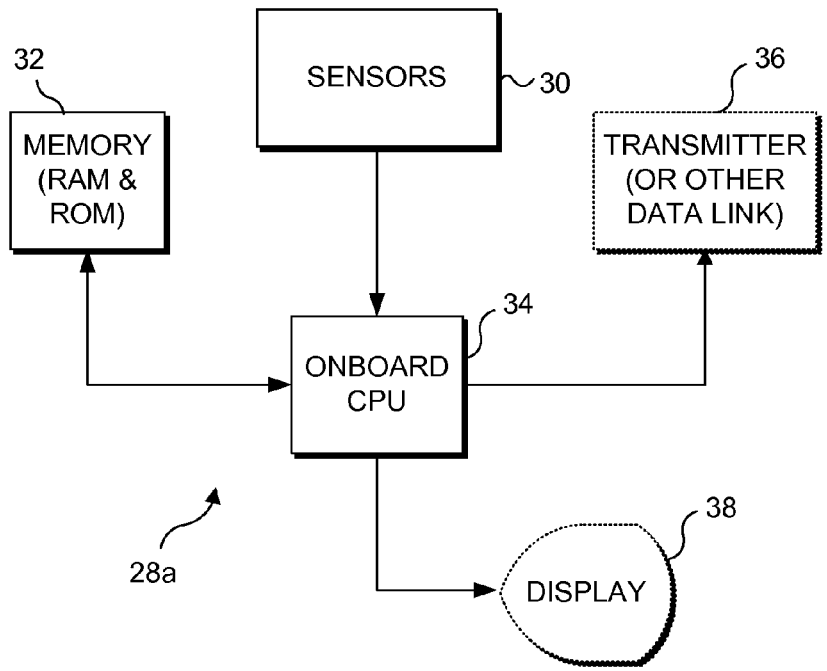
FIG. 3A is a functional block diagram illustrating the functional elements of an embodiment in which the metrics are processed within the vehicle in real-time.

FIG. 3A is a functional block diagram 28a illustrating the functional elements of an exemplary embodiment in which the metrics are processed within the vehicle. The vehicle is equipped with sensors 30 configured to collect the required metrics. The sensors are logically coupled with an onboard vehicle CPU 34, which is configured to implement the method steps generally described above. CPU 34 is logically coupled to a memory 32 in which are stored the machine instructions that are executed by the CPU to carry out these logical steps. The plurality of metrics collected by sensors 30 can also be stored in memory 32. A (preferably optical or wireless) transmitter 36 (or other data link) can be included to enable either the plurality of metrics or the analysis to be communicated to a remote computing device. An optional display 38 can be included in the vehicle to provide real-time feedback to the driver.

Figure 3B:
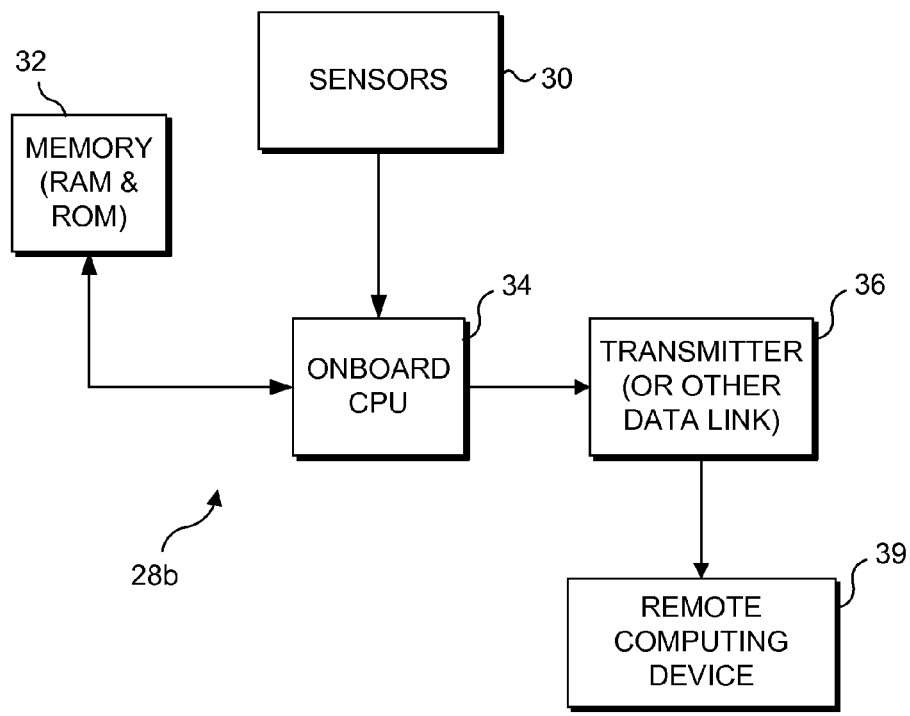
FIG. 3B is a functional block diagram illustrating the functional elements of an embodiment in which the metrics are processed by a computing device remote from the vehicle.

FIG. 3B is a functional block diagram 28b illustrating the functional elements of an exemplary embodiment in which the metrics are processed by a remote computing device. Once again, the vehicle is equipped with sensors 30 configured to collect the required metrics. The sensors are logically coupled with an onboard vehicle CPU 34, which is configured to transmit the collected metrics to remote computing device 39 through transmitter 36 (or other data link). In a particularly preferred embodiment, transmitter 36 is a wireless transmitter. In such an embodiment, the method steps generally described above for processing the collected metrics can be executed by the remote computing device. CPU 34 is logically coupled to memory 32 in which the collected metrics can be stored, if the metrics are not to be transmitted to the remote computing device in real-time. Even if the metrics are transmitted to the remote computing device in real-time, such metrics can be stored in memory 32 as a backup in case the transmission is not successful. In such an embodiment, a display is not likely to be beneficial, unless the remote computing device is configured to transmit the analytical results back to the vehicle for display to the driver.

FIG. 4 schematically illustrates a vehicle 22a that includes a GPS unit 44 configured to collect GPS data that can be used to determine a plurality of metrics for use in determining a driver performance ranking. Such an embodiment enables the driver performance ranking discussed above to be generated without requiring individual or additional sensors to be integrated into the vehicle (although it should be recognized that such individual sensors could be used in addition to (or as an alternative source of) the data provided by the GPS unit, to provide additional metrics used in determining a driver's performance ranking, generally consistent with the method steps described above with respect to FIG. 1). Vehicle 22a, such as a bus or a truck (or automobile, or construction equipment, generally as described above) includes GPS unit 44 coupled with an ignition system 42 of the vehicle. In an exemplary embodiment, the GPS unit will be coupled with the ignition switch, such that it is assumed that when the ignition switch is on, the engine of the vehicle is actually running, and the GPS unit will be activated. As described in greater detail below, GPS data can be used for a plurality of metrics, including idle time, deceleration time and magnitude, acceleration time and magnitude, and to determine if a driver has violated a speed limit. The most basic GPS unit is able to determine a position of the vehicle at a specific time. That positional information can be used to calculate the speed of a vehicle by determining the change in position of the vehicle between two successive points in time, and to calculate the acceleration or deceleration of the vehicle by determining the change in speed of the vehicle over a time increment. More typically, GPS units automatically determine position, speed, and acceleration/deceleration internally, and these metrics would then not need to be determined by an external computing device (remote or local).

GPS unit 44 preferably includes or is connected to a wireless transmitter (not separately shown), such that the GPS data can be wirelessly transmitted to a remote computing device, preferably in real-time. The remote computing device can be programmed to manipulate the GPS data to determine a plurality of metrics. It should be recognized that as an alternative, GPS unit 44 can include an onboard memory, such that the GPS data are stored in the GPS unit, to be uploaded to a remote computing device at a later time (for example, using a wireless or hardwired data link). Significantly, GPS unit 44 enables an analysis of driver performance or vehicle performance to be determined, even if the vehicle is not equipped with separate other sensors of the metric data or an onboard computer (as are required in the embodiments of FIGS. 2, 3A, and 3B). It should be understood that the concepts disclosed herein encompasses coupling such a GPS unit to vehicle sensors and/or a vehicle data bus, such that driver/vehicle performance data collected by other vehicle sensors can be combined with GPS data and conveyed to a remote computing site. While not specifically shown in FIG. 4, it should be understood that GPS unit 44 can include a processor that uses GPS data and sensor data collected from the vehicle to calculate performance metrics, which are then combined with GPS data and conveyed to the remote computing site.

Hosted Website for Tracking Vehicle/Driver Performance Data

One aspect of the concepts disclosed herein is a hosted website, enabling drivers and fleet operators to monitor the performance of drivers and/or vehicles, based on data collected during the drivers operation of a vehicle.

In general, one or more performance metrics are automatically collected while a driver is operating a vehicle, and that data is used to generate a score or rating of the driver's or vehicle's performance. In at least one embodiment, the score is normalized to enable driver/vehicle scores from other types of vehicles to be compared. Then, the driver/vehicle performance data is posted to the hosted website.

FIG. 5 is a functional block diagram of various elements that can be employed to implement the hosted driver/vehicle performance website concept, in one exemplary embodiment. The elements includes a plurality of enrolled vehicles 148a-148c (noting that the concepts disclosed herein can be applied to a different number of vehicles), a plurality of drivers 152a-152c (noting that the concepts disclosed herein can be applied to a different number of drivers), a plurality of vehicle operators 156a-156c (noting that the concepts disclosed herein can be applied to a different number of vehicle operators), and a remote monitoring service 150. Each vehicle includes the components discussed above in connection with FIG. 2 (noting the number and types of sensors disclosed in FIG. 2 are exemplary, and not limiting), enabling the vehicle to convey performance data from the vehicle to remote monitoring service 150, which monitors the performance data from each vehicle 148a-148c over time to enable the driver's performance while operating that vehicle to be evaluated. In an exemplary embodiment monitoring service 150 generates a webpage (as indicated by webpages 154a-154c) for each vehicle operator, so the vehicle operator can review the performance rankings of each of their drivers. It should be understand that the concepts disclosed herein also encompass other website designs, and the webpage per fleet is not the only possible model. In one embodiment, drivers will have their own webpage 154d (alternatively, drivers can access the webpage for their specific fleet).

It should be understood that monitoring service 150 is implemented using a remote computing device, and that the term remote computing device is intended to encompass networked computers, including servers and clients, in private networks or as part of the Internet. The monitoring of the vehicle/driver performance data and driver performance ranking by monitoring service 150 can be performed by multiple different computing devices, such that performance data is stored by one element in such a network, retrieved for review by another element in the network, and analyzed by yet another element in the network.

Exemplary System Environment

FIG. 6 is a functional block diagram of an exemplary system employed to implement some of the concepts disclosed herein. The functional block diagram illustrates exemplary components used in each vehicle 128 that is enrolled in a vehicle/driver performance monitoring service, to implement some of the method steps discussed above. An exemplary vehicle/driver performance monitoring service is based on adding an optional data buffer 136 (or other short-term memory storage) and a bi-directional data link 134 to each enrolled vehicle (in an exemplary, but not limiting embodiment, the data buffer and data link are combined into a single component). It should be understood that the short term memory storage is not required for embodiments where the performance data transmitted from the enrolled vehicle does not include operational, vehicle, or driver related data that must be briefly stored. In an exemplary embodiment, the data link is a combination radio frequency (RF) transmitter and receiver, although separate transmitters and receivers could be used (note the term RF specifically encompasses cellular telephone based data links). A data terminal can optionally be included in the vehicle to facilitate operator entry of information and operator transmission of information that is presented to the operator on a display within the vehicle. Data collected on a portable data collection device during an inspection can also be uploaded through such a data terminal, or independently by direct transmission to the remote monitoring service. While RF data transmission represents an exemplary embodiment, other types of data transmission could be employed. If the vehicle does not already include performance data/operational data collecting components 130, such components are added. Most vehicles manufactured today include operational data collecting components already, as many of today's vehicles are designed to use such continuously generated operational data to control operation of the vehicle in real-time, and such vehicles generally include data collecting components, data buses, and controllers that use the operational data to control the operation of the vehicle. The vehicle includes at least one processor 132 that performs the function of managing the transmission of performance data from the vehicle to the remote monitoring service, according to one or more of the transmission paradigms discussed herein. In embodiments where the performance data includes temporary storage of operational data, the processor also implements the function of temporarily storing operational data from components 130 in data buffer 136 or other temporary storage, and using bi-directional data link 134 to convey real-time performance data and/or the buffered operational/performance data from the enrolled vehicle to a remote computing device 140 (which is used to analyze the performance of the vehicle and/or driver). It should be understood that those processor functions can be implemented by a single processor, or distributed across multiple processors.

In some embodiments, an output 138 is also included, to provide information to the driver in a form that can be easily understood by the driver. Output 138 can be implemented using a speaker providing an audible output, and using a display providing a visual output. Note that output 138 can be combined into a single component with the data buffer and the data link, so only a single additional component is added to the vehicle (recognizing that most vehicles already include the additional required components, such as the operational data collecting components and the processor).

While not specifically shown in FIG. 6, in particularly preferred embodiments the vehicle is equipped with a GPS unit (exemplary GPS units are illustrated in FIGS. 4 and 8). In a related preferred embodiment the processor, the GPS component, any buffer, and data link are combined into a single telematics device. Such a device will send GPS and vehicle/driver performance data to the remote computing device discussed below at a plurality of different times during the course of the operation of the vehicle. In general, the telematics device will transmit data at intervals ranging from as frequently as every 5 to 15 seconds, or as rarely as every 5 minutes, recognizing that such intervals can vary, and are intended to be exemplary, and not limiting.

As indicated in FIG. 6, remote computing device 140 (operated by the monitoring service) is logically coupled via a network 142 (such as the Internet) to a computing device 144 (such as a personal computer, a tablet, or a smart phone) accessible to a driver (in embodiments where driver performance rankings are shared with drivers, noting only one such driver device is shown in the Figure; however, the monitoring service will likely be monitoring the performance of a plurality of drivers, each likely having access to a different computing device 144), and a computing device 146 accessible to a vehicle operator (noting that in at least some embodiments, the monitoring service performs the monitoring function for a plurality of different vehicle operators/fleets). Network 142 facilitates communication between computing devices 140, 144, and 146, enabling the monitoring service to efficiently communicate with drivers and vehicle operators. It should be noted that the concepts disclosed herein encompass embodiments where the monitoring service and vehicle operator are the same entity.

The concepts disclosed herein are in at least some embodiments intended to be used by fleet owners operating multiple vehicles, and the performance data conveyed to the remote location for diagnosis will include an ID component that enables each enrolled vehicle to be uniquely identified.

Exemplary Computing Environment

FIG. 7 is a functional block diagram of an exemplary computing device that can be employed to implement some of the method steps disclosed herein. It should be understood that the concepts disclosed herein encompass processing of data collected at a vehicle both in the vehicle and at a remote computing device.

FIG. 7 schematically illustrates an exemplary computing system 250 suitable for use in implementing the processing functions disclosed herein. Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of performance data (and in some embodiments, of position data) collected from enrolled vehicles, to identify mechanical faults in the enrolled vehicles. The machine instructions implement functions generally consistent with those described above. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260.

Also stored in the non-volatile memory are operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to monitor vehicle performance data over time to detect a mechanical fault). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. In embodiments where computing system 250 is implemented in a vehicle, the computing system 250 can be configured to run autonomously, such that a user input device need not be regularly employed.

Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. In embodiments where computing system 250 is implemented in a vehicle, the computing system 250 can be vehicle performance data (and position data when desired) collected in connection with operation of enrolled vehicles to configured to run autonomously, such that a user output device not regularly employed.

Data link 264 is configured to enable data to be input into computing system 250 for processing. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

Note that vehicle/driver performance data from the enrolled vehicles will be communicated wirelessly in at least some embodiments, either directly to the remote computing system that analyzes the data to evaluate the driver's performance, or to some storage location or other computing system that is linked to computing system 250.

It should be understood that the terms "remote computer", "computing device", and "remote computing device" are intended to encompass a single computer as well as networked computers, including servers and clients, in private networks or as part of the Internet. The vehicle/driver performance data received by the monitoring service from the vehicle can be stored by one element in such a network, retrieved for review by another element in the network, and analyzed by yet another element in the network. While implementation of the methods noted above have been discussed in terms of execution of machine instructions by a processor (i.e., the computing device implementing machine instructions to implement the specific functions noted above), the methods could also be implemented using a custom circuit (such as an application specific integrated circuit or ASIC).

The concepts disclosed herein encompass collecting data from a vehicle during operation of the vehicle. The data collected is used to analyze the performance of at least one of the driver and the vehicle. In preferred embodiments, the data is collected during operation of the vehicle and wirelessly transmitted from the vehicle during its operation to a remote computing device using a cellular phone network based data link. The frequency of such data transmissions can be varied significantly. In general, more data is better, but data transmission is not free, so there is a tension between cost and performance that is subject to variation based on an end user's needs and desires (some users will be willing to pay for more data, while other users will want to minimize data costs by limiting the quantity of data being transferred, even if that results in a somewhat lower quality data set). The artisan of skill will be able to readily determine a degree to which data quality can be reduced while still provide useful data set.

Exemplary GPS Device with Onboard Computing Environment

FIG. 8 is a functional block diagram of an exemplary telematics device added to an enrolled vehicle to implement one or more of the methods of disclosed herein.

An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller (noting that the single input is exemplary, and not limiting, as additional inputs can be added, and such inputs can be bi-directional to support data output as well).

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component to wirelessly convey such data to vehicle owners. The exemplary data set discussed above in connection with calculated loaded cost per mile can also be employed. These data transmission can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164. If desired, additional memory can be included to temporarily store data id the RF component cannot transfer data. In particularly preferred embodiments the RF components is GSM or cellular technology based.

In at least one embodiment, the controller is configured to implement the method of FIG. 1 by using one or more of data collected from GPS 170 and data from input 168.

Exemplary Tablet for in Vehicle Use

FIG. 9 is a functional block diagram of an exemplary mobile computing device 100 for fleet telematics including a display 106 and a controller 102 configured to present at least one telematics application to a user. A non-transitory physical memory 104 is included, upon which machine instructions define one or more applications are stored. Device 100 includes an option RFID reader 108 (or other sensor) that enables an inspection application to verify that the device is proximate an inspection location (an optical scanner could also be employed, as well as other sensors). In exemplary but not limiting embodiments, the device includes at least one data input 110 that can be used to logically couple the device to a vehicle data bus.

Device 100 may include additional components, including but not limiting to a GSM component, a Wi-Fi component, a USB component, a rechargeable battery, and in at least one embodiment a GPS component.

Exemplary Techniques for Capturing Load Related Data in a Digitized Document

The concepts disclosed herein also encompass the subject matter in FIGS. 10A and 10B, which are flowcharts describing automatically capturing load related data in a digitized document. In general, the digitized document will be a paper document that is digitized, such as a bill of laden, a manifest, a weight ticket, or some other load related paper document. The digitized document can also be an image, such as an image of damaged freight, or of freight being loaded onto or taken off of a vehicle.

It should be understood that the data can be added to the scanned/capture documents either at the time of document capture, or after the captured document file has been generated. In at least one embodiment, the additional data is added as metadata to the captured document file.

In general, the scanned/captured document will be load related paperwork, that a shipper or carrier uses to verify that a load has been delivered. The additional data, referred below to load related vehicle data (understanding that such load related vehicle data can be included into the scanned document file as metadata, but can also be a separate data file that can be readily correlated to a scanned document file). Many types of metadata can be collected and provide additional value to shippers or carriers. Useful metadata includes data that can be used to evaluate the driver performance while a specific load was in transit. Shippers and carriers can use such load related vehicle data to verify the driver performed in a safe and professional manner. Carriers can use load related vehicle data to capture efficiency metrics that will enable the carrier to determine if the specific load was profitable or not. Load related vehicle data related to a temperature in a cargo hold, or verification of time and location of delivery, can be used by shippers to determine if contractual obligations of the carrier had been met.

In general, the scanned or otherwise captured documents are obtained using a document capture application (or digitization application or digitization component, such as a camera) on a mobile computing device. FIG. 9 illustrates an exemplary mobile computing device. It should be understood that smart phones and/or laptop computer can also be employed, so long as such devices can acquire the metadata discussed immediately above can be added to the scanned document file or otherwise associated with the scanned document file for review at a remote computing device.

In at least one embodiment the load related additional data (the load related data being on or more of GPS data, ECU data, and/or sensor data) is incorporated into the digitized document or image. In at least one embodiment the load related additional data (the load related data being on or more of GPS data, ECU data, and/or sensor data) is incorporated into a separated digital file that is associated with the digitized document or image, such that at a later time the file including the load related data can be readily associated with the digitized document or image (in at least one embodiment, this is accomplished by naming the digital file corresponding to the load related data similarly to the digital file corresponding to the digitalized/digitized document or image; i.e., 123_load_data and 123_digitized_document/123_image).

Various techniques can be used to import load related vehicle data into the mobile computing device used for document capture. Physical and wireless data connections can be used.

In one embodiment, the mobile computing device establishes a wireless data connection with a vehicle databus/ECU, from which the load related vehicle data is acquired.

In one embodiment, the mobile computing device establishes a wireless data connection with a vehicle telematics device, such as that shown in FIG. 8, from which the load related vehicle data is acquired. In some embodiments the telematics device is tapped into the vehicle databus/ECU. In some embodiments the load related vehicle data is generated by the telematics device. In some embodiments the load related vehicle data is generated by sensors in the vehicle attached to either the telematics device or the vehicle data bus. In some embodiments the load related vehicle data includes both data generated by the telematics device and data extracted from the vehicle data bus/ECU.

It should be recognized that the mobile computing device can also be physically coupled to one or more of a telematics device, a vehicle ECU/vehicle data bus, and sensors in the vehicle (such as temperature sensors to verify cargo hold temperature conditions).

Exemplary load related vehicle data includes one or more of the following: vehicle VIN, vehicle odometer, driver ID as entered on an exemplary mobile computing device, trip # as entered on an exemplary mobile computing device, fuel level automatically obtained from vehicle; fault codes automatically obtained from vehicle, position/GPS data at time of digitization, position/GPS data (i.e., a breadcrumb or trip report) for a trip associated with the delivery, vehicle data from the vehicle data bus (such as speed, brake use, temperature in cargo area, fuel use, fault codes, hard braking, max speed), and vehicle data from a telematics device (speed data, idle time data computed by telematics device, hard braking events detected by the telematics device, hard cornering events detected by the telematics device, and sensor data from one or more sensors on the vehicle that are logically coupled to the telematics device (exemplary types of sensors include one or more of a power take off unit actuation sensor, a stop arm actuation sensor, a snow plow actuation sensor, a door opening sensor, an emergency door opening sensor, a temperature sensor, and a door lock sensor)).

Load document capture functionality can be provided using applications such as Transflo from Pegasus TransTech and from a company named picCapture (Florida). The concepts disclosed herein expand on the document capture functionality of such products by automatically adding to such scanned documented load related vehicle data generated by a vehicle ECU, data generated by vehicle sensors coupled to a vehicle data bus and/or load related vehicle data generated by a telematics device in the vehicle.

FIG. 10A is a flowchart of a method for adding load related data collected from a vehicle data bus, and added to scanned or capture load documents. In a block 300 a mobile device (such as a tablet (see FIG. 9), a smart phone, or other mobile computing device) including a document capture application (or other digitization functionality) is provided. In a block 302 a logical connection is established between the mobile computing device and a vehicle ECU and/or vehicle data bus. Such a logical connection can be accomplished in various manners. The mobile computing device can include a short range wireless data link, and a short range transmitter can be logically coupled to the vehicle data bus/vehicle ECU. The mobile computing device can be physically connected to the vehicle data bus/vehicle ECU using a hardwire data link (perhaps through the OBD-II or other diagnostic port, or otherwise physically coupled to the vehicle). The mobile computing device can be logically coupled to a vehicle telematics unit (such as that of FIG. 8) that itself is logically coupled to the vehicle data bus/vehicle ECU. In a block 304, load related data acquired from the vehicle data bus is included in the digitized load document (or digital load image). In an exemplary embodiment, the load related data is included in the metadata for the digital file. It should be understood that the concepts disclosed herein also encompasses embodiments where the load related data is stored as a separate digital file, associated (perhaps by naming convention) with the digitized load document/digital load image.

FIG. 10B is a flowchart of a method for adding load related data collected from a vehicle telematics device, and added to scanned or capture load documents. In block 300 a mobile device (such as a tablet (see FIG. 9), a smart phone, or other mobile computing device) including a document capture application (or other digitization functionality) is provided. In block 302b a logical connection is established between the mobile computing device and a vehicle telematics device (see FIG. 8 for an exemplary telematics device, which can be sourced from Zonar, Seattle, Wash.). Such a logical connection can be accomplished in various manners. The mobile computing device can include a short range wireless data link, and the telematics device can include a short range transmitter, or the telematics device can be logically coupled to an accessory short range transmitter. The mobile computing device can be physically connected to the vehicle telematics device (in some embodiments a mobile computing device dock (including power and data connections) is provided, and the dock is logically coupled to the telematics device). In a block 304, load related data acquired from the vehicle telematics device is included in the digitized load document (or digital load image). In an exemplary embodiment, the load related data is included in the metadata for the digital file. It should be understood that the concepts disclosed herein also encompasses embodiments where the load related data is stored as a separate digital file, associated (perhaps by naming convention) with the digitized load document/digital load image. In a block 306 (noting that block 306 can also be implemented in the method of FIG. 10A), the digitized load document/image including the additional load related data from the telematics device (or vehicle ECU/vehicle data bus) is wirelessly conveyed to a remote storage device. In an exemplary embodiment the remote storage device is operated by a 3$^{rd}$ party who charges the vehicle owner a service fee. The wireless data link can be active immediately upon document capture, or the data transmission can occur at a next scheduled transmission. In general, fleet operators prefer to acquire the digitized load documents/images as quickly as practical. In some embodiments, the wireless data link is part of the mobile computing device having the document scanning/digitization functionality. In some embodiments, the wireless data link is part of the telematics device.

FIG. 11 schematically illustrates a smart cable that performs the function of providing a communication link between a vehicle data bus and another computing device, such as a mobile computing device that includes a document capture/digitization functionality. Smart cable 524, also referred to as a JBus cable, ZCON Lie, and/or ZTooth, performs the function of enabling a mobile computing device having a document capture functionality to establish a logical communication with a vehicle data bus, to enable extraction of data resident or available on the vehicle data bus (or from a vehicle ECU). Smart cable 524 includes a data link to an external controller (or other mobile computing device, including but not limited to a smart phone or mobile computing device), a micro controller 528 configured to logically communicate to a vehicle ECU or vehicle data bus, and a connector/input configured to physically connect to a vehicle databus or vehicle ECU.

In at least some embodiment, smart cable 524 includes a wireless data link component (such as Wi-Fi, Bluetooth, or RF), that enables the smart cable to export data from a vehicle data bus/vehicle ECU to a mobile computing device. In one related embodiment, smart cable 524 is used to enable smart phone uses to extract vehicle fault code data to their smart phones. Such fault codes can represent load related vehicle data.

FIG. 12 is a flowchart of a method for analyzing adding load related data collected from a vehicle data bus or vehicle telematics device at a computing device remote from the vehicle. In a block 308 the digitized load document/image is retired from remote storage. In some embodiments, the retrieval is prompted by a remote user affirmatively deciding to review the data. In some embodiments, this is an automated process (and in at least one such embodiment, the automated process is triggered by receipt of the digitized load document/image). In a block 310, the load related data from the vehicle data bus/ECU and/or vehicle telematics device is extracted from the digitized load document/image (or from the associated separate digital file storing the load related data). In an optional block 312 (which is generally included when the method of FIG. 12 is fully automated), the extracted load related data from the vehicle ECU/telematics device is used to validate some aspect of the delivery corresponding to the digitized load document/image.

In one embodiment of the concepts disclosed herein, the extracted load related data is automatically reviewed to determine if the carrier has performed as agreed. That can mean checking a time stamp to see if the load was delivered on time. That can mean checking vehicle position data to see if the load was delivered to the proper location. That can mean checking a bread crumb trail to see if an agreed upon route was followed. That can mean checking temperature data to see if the load experienced off spec temperature conditions during transit (this is particularly valuable for shippers of perishable goods, such as food products, or other goods that can be damaged by excessive temperatures).

Where the load related data added to the scanned document (the digitized load document/image) relates to driver performance metrics, the automated validation step of block 312 can be used to assure the shipper that the driver performed in a safe and workmanlike manner. Such driver performance metrics can include one or more of the following: speed, hard braking events, brake temperature, tire pressure, hard cornering events, and excessive brake use. Such metrics can indicate that the driver of the load operated in an unsafe or risky manner. Shippers would find such information valuable as they can use such information to evaluate whether to use a given shipper/carrier in the future.

While the term mobile computing device has been used to refer to the component performing the load related document/image digitization functionality, it should be understood that the load related document/image digitization functionality can be implemented using a computing device not necessarily mobile, so long as a logical connection to the telematics device or vehicle ECU, databus, and/or sensors is established. For example, some fleet operators may decide to deploy a computing device that is more or less permanently wired into their vehicles (to prevent such a computing device from being easily lost, stolen or misused).

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method capturing load related vehicle data when generating electronic load documents, comprising the steps of:
    (a) providing a mobile computing device having document capture functionality;
    (b) using the mobile computing device to capture a load related shipping paper, thereby providing a digital shipping paper;
    (c) automatically adding load related vehicle data to the digital shipping paper captured by the mobile computing document; and
    (d) wherein said load related vehicle data is acquired from one out of a group of sources consisting essentially of:
        (i) a vehicle data bus;
        (ii) a vehicle ECU; and
        (iii) a vehicle telematics device that includes a GPS component.

2. The method of claim 1, wherein the load related vehicle data is acquired from said vehicle data bus.

3. The method of claim 1, wherein the load related vehicle data is acquired from said vehicle ECU.

4. The method of claim 1, wherein the load related vehicle data is acquired from said vehicle telematics device.

5. The method of claim 1, wherein the load related vehicle data is added to the digital shipping paper captured by the mobile computing document as metadata.

6. The method of claim 1, wherein the load related vehicle data is saved in a different file but associated with the digital shipping paper by using a file name having a portion that is identical to a portion of the file name for the digital shipping paper.

7. The method of claim 1, wherein the load related vehicle data includes temperature data from a cargo hold so a shipper can verify that proper temperature conditions were maintained during shipment of the load corresponding to the digital shipping paper.

8. The method of claim 1, wherein the load related vehicle data includes data generated during operation of the vehicle while the load corresponding to the digital shipping paper is in transit.

9. The method of claim 1, wherein the load related vehicle data includes driver performance related data that a shipper can use to verify that a driver operated safely during shipment of the load corresponding to the digital shipping paper.

10. The method of claim 1, wherein the load related vehicle data includes driver performance related data that a fleet operator can use to verify that a driver operated efficiently during shipment of the load corresponding to the digital shipping paper.

11. The method of claim 1, wherein the load related vehicle data includes data that a shipper can use to verify that the load corresponding to the digital shipping paper was delivered on time.

12. The method of claim 1, wherein the load related vehicle data includes data that a shipper can use to verify that the load corresponding to the digital shipping paper was delivered to the correct location.

13. The method of claim 1, wherein the load related vehicle data includes fuel data that a fleet operator can use to determine how much fuel was used during shipment of the load corresponding to the digital shipping paper.

14. The method of claim 1, wherein the load related vehicle data includes efficiency data that a fleet operator can use to determine how efficiently the vehicle was operated during shipment of the load corresponding to the digital shipping paper.

15. A mobile computing device for vehicles, comprising:
    (a) a processor;
    (b) a non-transitory, physical memory medium having machine instructions stored thereon that when executed by the processor implement a plurality of functions, the plurality of functions including automatically incorporating load related vehicle data into a digital shipping paper captured using the mobile computing device; and
    (c) wherein said load related vehicle data originates in one out of a group consisting essentially of:
        (i) a vehicle data bus;
        (ii) a vehicle ECU; and
        (iii) a vehicle telematics device that includes a GPS component.

16. The mobile computing device of claim 15, wherein the load related vehicle data includes efficiency data that a fleet operator can use to determine how efficiently the vehicle was operated during shipment of the load corresponding to the digital shipping paper.

17. The mobile computing device of claim 15, wherein the load related vehicle data is acquired from said vehicle data bus.

18. The mobile computing device of claim 15, wherein the load related vehicle data is acquired from said vehicle ECU.

19. The mobile computing device of claim 15, wherein the load related vehicle data is acquired from said vehicle telematics device.

20. The mobile computing device of claim 15, wherein the load related vehicle data is added to the digital shipping paper captured by the mobile computing document as metadata.

21. The mobile computing device of claim 15, wherein the load related vehicle data is saved in a different file but associated with the digital shipping paper by using a similar file name.

22. The mobile computing device of claim 15, wherein the load related vehicle data includes temperature data from a cargo hold so a shipper can verify that proper temperature conditions were maintained during shipment of the load corresponding to the digital shipping paper.

23. The mobile computing device of claim 15, wherein the load related vehicle data includes data generated during operation of the vehicle while the load corresponding to the digital shipping paper is in transit.

24. The mobile computing device of claim 15, wherein the load related vehicle data includes driver performance related data that a shipper can use to verify that a driver operated safely during shipment of the load corresponding to the digital shipping paper.

25. The mobile computing device of claim 15, wherein the load related vehicle data includes driver performance related data that a fleet operator can use to verify that a driver operated efficiently during shipment of the load corresponding to the digital shipping paper.

26. The mobile computing device of claim 15, wherein the load related vehicle data includes data that a shipper can use to verify that the load corresponding to the digital shipping paper was delivered on time.

27. The mobile computing device of claim 15, wherein the load related vehicle data includes data that a shipper can use to verify that the load corresponding to the digital shipping paper was delivered to the correct location.

28. The mobile computing device of claim 15, wherein the load related vehicle data includes fuel data that a fleet operator can use to determine how much fuel was used during shipment of the load corresponding to the digital shipping papers.

29. A non-transitory memory medium having machine instructions stored thereon for automatically incorporating load related vehicle data into a digital shipping paper captured using a computing device.

30. The non-transitory memory medium of claim 29 having machine instructions stored thereon for automatically implementing the functions of acquiring the load related vehicle data from a vehicle data bus.

31. The non-transitory memory medium of claim 29 having machine instructions stored thereon for automatically implementing the functions of acquiring the load related vehicle data from a vehicle ECU.

32. The non-transitory memory medium of claim 29 having machine instructions stored thereon for automatically implementing the functions of acquiring the load related vehicle data from a vehicle telematics device.

* * * * *